June 6, 1961  W. J. TURNUPSEED  2,987,652
OVERLOAD PROTECTIVE DEVICE FOR POLYPHASE SYSTEM
Filed Oct. 20, 1958
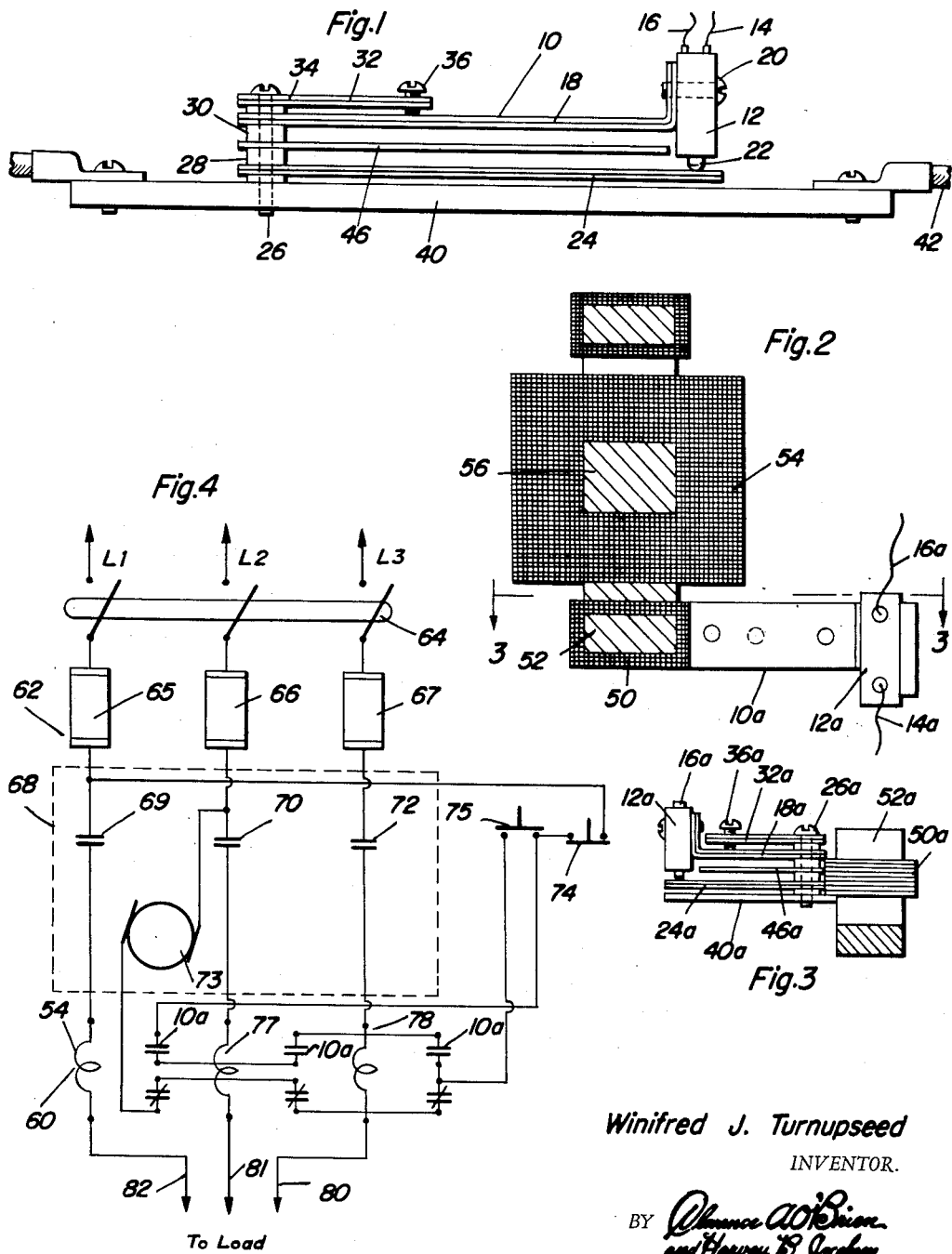
Winifred J. Turnupseed
INVENTOR.

United States Patent Office

2,987,652
Patented June 6, 1961

---

2,987,652
OVERLOAD PROTECTIVE DEVICE FOR POLYPHASE SYSTEM
Winifred J. Turnupseed, 1000 W. Olive St., Porterville, Calif.
Filed Oct. 20, 1958, Ser. No. 768,228
1 Claim. (Cl. 317—40)

This invention relates to safety devices for polyphase electrical systems and more particularly to a heat sensitive overload relay which may be connected with a system in a variety of ways.

Although the principles of this invention are applicable in connection with a number of different equipments, the overload relay has a very important application with a polyphase electrical network that includes control equipment for a motor, transformer, etc. Typical control equipment would be a magnetic starter, a control circuit, phase and load lines either with or without phase failure control protective devices. U.S. Patent No. 2,609,425 discloses a typical polyphase network meeting these requirements.

The above patent discloses a protective system for electrical apparatus connected with a polyphase network, where the phase lines are promptly opened in response to an unsafe phase condition, e.g. the fuse in one phase line becoming open. The patented system serves its intended purpose very effectively, responding precisely in accordance with the necessities in the event of numerously caused phase failures.

An object of this invention is to provide a thermal overload relay uneffected by ambient climatic changes and which may be integrated with the network containing phase failure protective equipment disclosed in the above noted patent.

A further and more general object of the invention is to provide a thermally operative electrical overload relay that has principal, but not exclusive, application with polyphase networks. In addition to being operatively connected with phase failure control equipment, the relay may be connected directly in a phase line by means of an auxiliary heater. The auxiliary heater may assume one of the simplest forms such as a bus bar or other type of conductor in the phase line which, like the phase line, becomes heated in response to an abnormal flow of current. Heat generated in this way is the stimulus for actuating the overload relay.

One of the important features of the invention is its adaptability to various systems and networks. In addition to being connected directly in a phase line or being connected to one leg of a phase failure control relay in a typical network described in the above patent, the overload relay may be connected with one of the phase failure relay frames by using a shading coil on the relay frame. As the phase failure relay becomes energized beyond design limits for the network, the shading coil causes heat to be generated in an auxiliary heater that is preferably in the form of a mechanical support for the overload relay. Heat generated in this way is the stimulus for actuating the overload relay.

In any polyphase system there will be one relay installed in or connected for operation in coordination with each phase line. For reasons known in the art this is essential in that polyphase electrical apparatus will operate poorly for a period on single phase before breakdown of the polyphase apparatus. Hence, for an effective protective overload system, a single overload relay is required in each phase line of the polyphase system for most applications of protective equipment whether it responds to phase failure, thermal overload or both.

Another object of the invention is to provide an electrical overload relay which is thermally operative and has compensating means to correct for differences in climatic conditions so that the relay will operate independent of ambient atmospheric changes in humidity, temperature, etc. One of the simpler ways of accomplishing this is to have a snap switch carried by a bi-metallic strip, and a second bi-metallic strip used as the operator for the snap switch. Both strips are made to deflect in the same direction in response to temperature changes, moisture changes, etc. Since the switch operator and the body of the switch are each moved essentially equal distances in response to the same temperature changes caused by the atmospheric unpredictable conditions, the resultant displacement between the switch and its operator remains constant. Further, an adjusting structure made of a third bi-metallic strip and a setscrew coacts with the strip that supports the switch. However, the third bi-metallic strip is arranged to deflect in a direction opposite to the first mentioned pair of bi-metallic strips, while the setscrew acts as a fulcrum about which the switch supporting strip deflects.

In order to isolate the heat generated in a part of the electrical system, a heat shield is located between the switch operating strip and the switch supporting strip. With the heat source on the same side of the heat shield as only one of the bi-metallic strips, the other bi-metallic strip is protected from the auxiliary heater whose heat, undiminished and non-reinforced by ambient atmospheric currents, is desired for the overload switch operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side view of an electrical overload relay that is especially useful with polyphase electrical networks.

FIGURE 2 is a cross-sectional view of a phase failure relay and frame together with a shading coil on the phase failure relay frame and an overload relay connected for operation by heat generated in the shading coil.

FIGURE 3 is a sectional view taken on the line 3—3 of FIGURE 2.

FIGURE 4 is a diagrammatic representation of a typical electrical apparatus protective system for a polyphase network and having one thermal overload relay arranged to protect each phase line.

Overload relay 10 (FIGURE 1) is constructed of a snap switch 12 having conductors 14 and 16 connected to the terminals thereof. Switch 12 is secured to the outer end of a bi-metallic strip 18 by a fastener, as bolt 20. Switch 12 has a switch operator 22 which is actuated by bi-metallic strip 24. Both strips are mounted on post 26 and held properly spaced by collars 28 and 30 on the post. A third bi-metallic strip 32 is secured at its inner end to post 26 and held apart from strip 18 by spacer 34 on posts 26. Strips 18 and 24 are arranged to deflect in the same direction in response to a heating or cooling condition. Strip 32, however, is arranged to deflect in the opposite direction. It is shorter than strip 18 and has an adjustable fulcrum for strip 18. The adjustable fulcrum is preferably a setscrew 36 adjustably carried by strip 32 and contacting the top surface of strip 18.

The support 40 for post 26 constitutes an auxiliary heater since it is a conductive bar connected in load or phase line 42. Current flowing through phase line 42 must pass through conductive bar 40. When an abnormal current exists bar 40 will become heated thereby heating strip 24 which is mounted closer to it than strips 18 and 32. In order to confine the heat to strip 24 and isolate strips 18 and 32 from the heat generated in bar 40, there is a heat insulating shield 46 attached at its inner end to post 26 between spacers 28 and 30. The heat shield 46 may be made of numerous substances such as refractory materials, asbestos or a shiny reflecting material.

The operation of relay 10 is as follows: Bi-metallic strip 24 is heated by the heat generated in a part of the electrical system. For the purposes of FIGURE 1 it is assumed that bar 40 is the auxiliary heater, and as described, the bar is in one of the phase lines thereby being sensitive to abnormal current in one of the phase lines of a polyphase electrical network. Accordingly, strip 24 constitutes means which are sensitive to the heat generated in a part of the polyphase system for actuating switch 12. For the moment it is assumed that switch 12 is on a stationary or rigid support. In such case strip 24 would be completely sensitive to any atmospheric changes. As a consequence switch 12 would be actuated prematurely in some instances and too late in other instances.

Accordingly, there are means in overload relay 10 to compensate for varying thermal atmospheric conditions. These means consist of bi-metallic strip 18 mounted to deflect in the same direction as switch operating strip 24 and in response to the same varying atmospheric temperature changes. Further, the auxiliary bi-metallic strip 32 is inverted with respect to the orientation of strips 18 and 24 so that it will deflect in a direction opposite to the deflection of strips 18 and 24. This further compensates for atmospheric changes and enables an adjustment at screw 36, to be made on strip 18.

In FIGURES 2 and 3 overload relay 10a has snap switch 12a identical to switch 12. The three bi-metallic strips 24a, 18a and 22a are connected to a support 40a in an organization and arrangement identical to that shown in FIGURE 1. The difference between embodiments of FIGURES 2, 3 and FIGURE 1 is found in the way that the relay 10a is connected in a polyphase electrical system and in support 40a which functions as an auxiliary heater to cause movement of the switch operating bi-metallic strip 24a. Strip 40a is a solid conductive bar made as an extension of shading coil 50 on electromagnetic relay frame side 52. Electromagnetic relay coil 54 (FIGURE 2) is mounted on frame 56, one side of which has shading coil 50 secured to it. Under ordinary operating conditions of relay coil 54 the eddy currents are insufficient to generate appreciable heat in the auxiliary heater formed by support 40a. However, when the relay coil 54 is abnormally loaded, shading coil 50 causes an abnormal heat load to exist in support 40a thereby actuating snap switch 12 by the deflection of switch actuating bi-metallic strip 24.

The relay having coil 54 is preferably a part of a phase failure control equipment 60 (FIGURE 4) diagrammatically represented. A typical phase failure protective system for electrical apparatus that are used with polyphase network is shown in U.S. Patent No. 2,609,425 and is substantially reproduced in FIGURE 4. The typical system 62 has lines $L_1$, $L_2$ and $L_3$ attached to a disconnect switch 64 and fusel as at 65, 66 and 67. Magnetic starter 68 having switch contacts 69, 70 and 72 together with magnetic starter holding coil 73 is wired to the fused ends of lines $L_1$, $L_2$ and $L_3$ and to the conventional stop-start switches 74 and 75. The phase failure control equipment 60 has three relays 54, 77 and 78, each of which has double sets of high and low voltage contacts and each of which is connected to the load lines 80, 81 and 82, the latter operatively connected with phase line extending from magnetic starter 68 and the stop-start switches 74 and 75. The relays in the phase failure control equipment each have a thermal overload relay (FIGURE 2) operatively connected with it. Accordingly, the leads 14a and 16a are connected in series with the magnetic starter control circuit and with the switch contacts of relays 54, 77 and 78. This will provide cut-off protection for motors, banks of transformers and other equipment, in the event of phase failure or an overload, for each individual phase line of a polyphase network at high, low or moderate surrounding temperatures and temperature variations. A circuit organization such as in FIG. 4 provides an automatic cut-off and an automatic reset for the control circuit, since leads 14a and 16a are connected with the control circuit of the system.

Accordingly, there are only three of a large number of ways which the thermal overload relay may be connected in a polyphase network. In FIGURE 1 the switch 12 is connected with the control circuit of control equipment provided in the polyphase electrical network. In this use the auxiliary heater is directly in one of the lines 42 which would be, for instance, line $L_1$, line $L_2$ or line $L_3$ on the fused side thereof. A second application is in connection with the frame of any relay and by a shading coil an auxiliary heater made by a solid extension protruding from the shading coil. The third method of use has the overload relay connected in the leg of phase failure protective equipment, e.g. FIGURE 4 which is a diagrammatic representation of equipment such as in the prior patent referred to herein. This third use has a second aspect in that the relay of FIGURE 2 may be one of the relays of the phase failure protective equipment described in the patent and diagrammatically shown in FIGURE 4. In all instances, though, the snap switch of the overload relay is preferably operatively connected with the control circuit of the control equipment and made to function through a magnetic starter, e.g. starter 58 of FIGURE 4, when such a starter is used in the polyphase network.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In an electrical overload relay for an electrical system having load lines, and control equipment provided with a control circuit, said relay comprising electrical switch means connected in series with said control circuit of the control equipment to disconnect the load from the load lines, heater means a part of said system, a first bi-metallic strip having one end rigidly mounted on a support means and disposed in spaced relationship with said heater means, a second bi-metallic strip having one end rigidly mounted on said support means and disposed to overlie said first bi-metallic strip in spaced relationship, heat insulating means disposed in spaced relationship between said first and said second bi-metallic strips, said switch means secured to the other end of said second bi-metallic strip and positioned whereby the other end portion of said first bi-metallic strip actuates the switch means, said first and said second bi-metallic strips being deflectable in the same direction in response to heat changes, a third bi-metallic strip having one end rigidly mounted on said support means and disposed to overlie said second bi-metallic strip in spaced relationship, said third bi-metallic strip having mounted thereon depending adjustable stop means, said stop means disposed to inhibit movement of said second bi-metallic strip by abutting said strip intermediate the ends thereof, said third bi-metallic strip being deflectable in a direction opposite to the deflection of said first and second bi-metallic strips.

References Cited in the file of this patent

UNITED STATES PATENTS 2,303,153    Woodworth _____ Nov. 24, 1942

(Other references on following page)

UNITED STATES PATENTS

| | | |
|---|---|---|
| 2,306,810 | Jones | Dec. 29, 1942 |
| 2,338,474 | Wilson | Jan. 4, 1944 |
| 2,411,351 | Armstrong | Nov. 19, 1946 |
| 2,412,483 | Warrington | Dec. 10, 1946 |
| 2,494,346 | Martin | Jan. 10, 1950 |
| 2,534,103 | Camilli | Dec. 12, 1950 |
| 2,742,547 | Chang-Kaing Tsai | Apr. 17, 1956 |
| 2,748,320 | Van Ryan | May 29, 1956 |
| 2,838,718 | Edmunds | June 10, 1958 |
| 2,924,817 | Dawkins et al. | Feb. 9, 1960 |